D. G. FINLEY.
MECHANICAL RIDING HORSE.
APPLICATION FILED DEC. 15, 1916. RENEWED JULY 10, 1920.
1,366,372.
Patented Jan. 25, 1921.
2 SHEETS—SHEET 2.
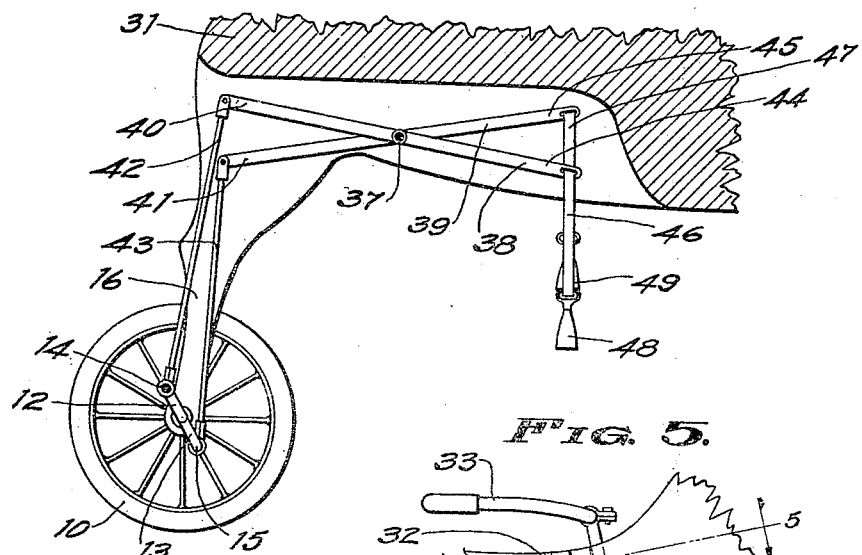
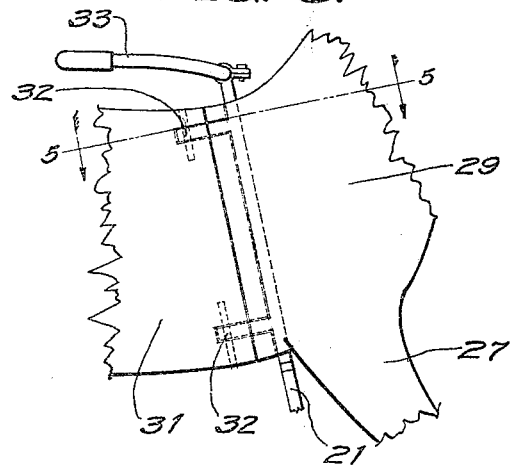
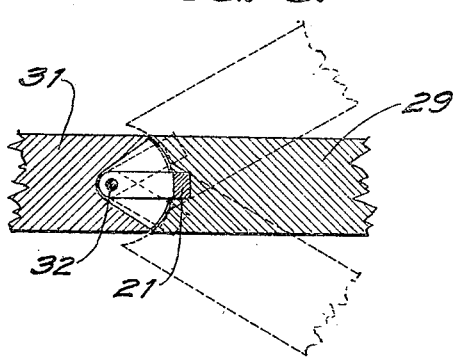
INVENTOR
David Guy Finley
BY
W. F. Davis & Son
ATTORNEY

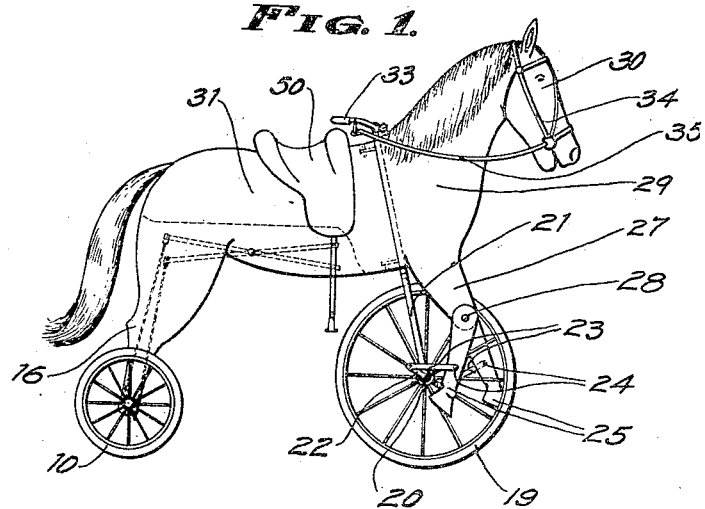
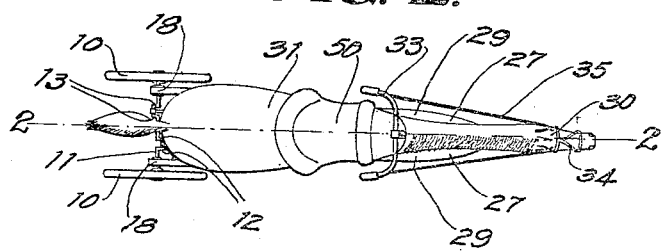
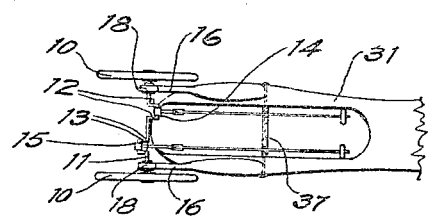

UNITED STATES PATENT OFFICE.

DAVID GUY FINLEY, OF DALLAS, TEXAS.

MECHANICAL RIDING-HORSE.

1,366,372.  Specification of Letters Patent.  Patented Jan. 25, 1921.

Application filed December 15, 1916, Serial No. 137,159. Renewed July 10, 1920. Serial No. 395,384.

*To all whom it may concern:*

Be it known that I, DAVID GUY FINLEY, a citizen of the United States, and resident of Dallas, in the county of Dallas and State of Texas, have invented certain new and useful Improvements in Mechanical Riding-Horses, of which the following is a full, clear, and exact description, such as will enable others skilled in the art to which it appertains to make and use the same.

The invention relates to a mechanical horse for children and seeks to provide a novel and attractive form of horse that will be pleasing and attractive to the child.

Most children admire horses and the combination of a horse and propelling mechanism will afford pleasure and exercise both of which are beneficial.

The present invention seeks to provide an improved form of mechanical riding horse that can be ridden by the rider as an animal horse and which will travel as a foot propelled tricycle.

With these and other objects in view the invention consists in the features of construction, combinations and arrangements of parts hereinafter set forth and more particularly pointed out in the appended claim, the accompanying drawings illustrating a form of the invention.

In the drawings:—

Figure 1 is a view in elevation of the improved mechanical riding horse.

Fig. 2 is a plan view of the mechanical riding horse.

Fig. 3 is a fragmentary inverted plan view of the mechanical riding horse.

Fig. 4 is an enlarged fragmentary sectional view taken on line 2—2 of Fig. 2.

Fig. 5 is an enlarged fragmentary view in elevation.

Fig. 6 is an enlarged sectional view taken on line 5—5 of Fig. 5.

The rear wheels 10 are rigidly secured to the crank axle 11, which is provided with the ordinary crank arms 12 and 13, and wrist pins 14 and 15 respectively, the rear legs 16 of the horse being journal connected to the axle at 18.

The front wheel 19 is rigidly mounted on the axle 20, which is journaled in the fork 21 of common construction, the crank arms 22 projecting in opposite directions from the axis of the shaft and having pivotally connected thereto the connecting rods 23, the rods being also pivoted at 24 to the lower sections 25 of the front legs, the latter and the upper sections 27 thereof being pivotally connected at 28 and forming a knee joint so that the sections 25 will swing to and fro when the horse is in motion and produce the appearance of walking and trotting.

The fork 21, shoulders 29, head 30 and upper sections 27 of the front legs are rigidly connected, and are pivoted to the main body 31 of the horse at 32 so that the connected parts just enumerated, together with the front wheel 19 can be turned from side to side by the usual handle bars 33 as illustrated in dotted lines of Fig. 6, for the purpose of steering the mechanical riding horse, the handle bars connecting to the fork in the usual manner, the bridle 34 and reins 35 being for appearance and to make the riding of the horse by the child seem more like riding an animal than a machine, it being obvious that the child can hold the reins and steer the horse thereby instead of by the handle bars.

Within the body 31 of the horse and pivoted on the shaft 37 are the levers 38 and 39, the rear ends 40 and 41 thereof respectively being pivotally connected by the respective connecting rods 42 and 43 to the wrist pins 14 and 15 respectively, while the respective front ends 44 and 45 of the levers have connected thereto the stirrup straps 46 and 47 respectively, the latter connecting to the respective stirrups 48 and 49.

The horse has mounted on the body thereof 31 the saddle 50 in suitable position to serve as a seat for a child so that the child's feet can easily reach the stirrups, the stirrup straps being of adjustable length as usual.

From the foregoing it will be understood that the stirrup straps 46 and 47 can easily be adjusted to the required length for the ordinary child, and that the latter can be seated on the saddle 50 and with the feet pedal the stirrups 48 and 49 and propel the horse.

The horse can easily be steered by the handle bars 33 and reins 35, the amusement afforded in riding the mechanical horse being very similar to that of riding an animal horse, while the sections 25 of the legs will swing to and fro on the pivot 28 and cause the machine to still further resemble a horse walking and trotting according to the speed thereof.

The mechanical riding horse is of particular advantage for physical training of children as well as affording amusement which is universally considered necessary to health and development.

What I claim as new, and desire to secure by Letters Patent, is:—

In a hobby horse, a body with thin sides forming a cavity opening downwardly and rearwardly, a transversely disposed pin passing through the thin sides of the body and the cavity, a pair of longitudinally disposed levers contained within said body and said cavity, rear legs extending downwardly from said body, a double-crank shaft journaled in the extremities of said legs, wheels on said shaft, the rear end of said levers positioned approximately over said crank shaft, approximately vertically disposed rods connecting the rear ends of said levers and the cranks of said crank shaft, the front ends of said levers positioned transversely on opposite sides of the cavity and near the outer sides of said body, a stirrup strap depending from the front end of each of said levers, and a stirrup connected to the lower end of each of said stirrup straps.

DAVID GUY FINLEY.